Oct. 23, 1934.  C. H. BARKER  1,978,245
HOSE COUPLING
Filed Feb. 14, 1934
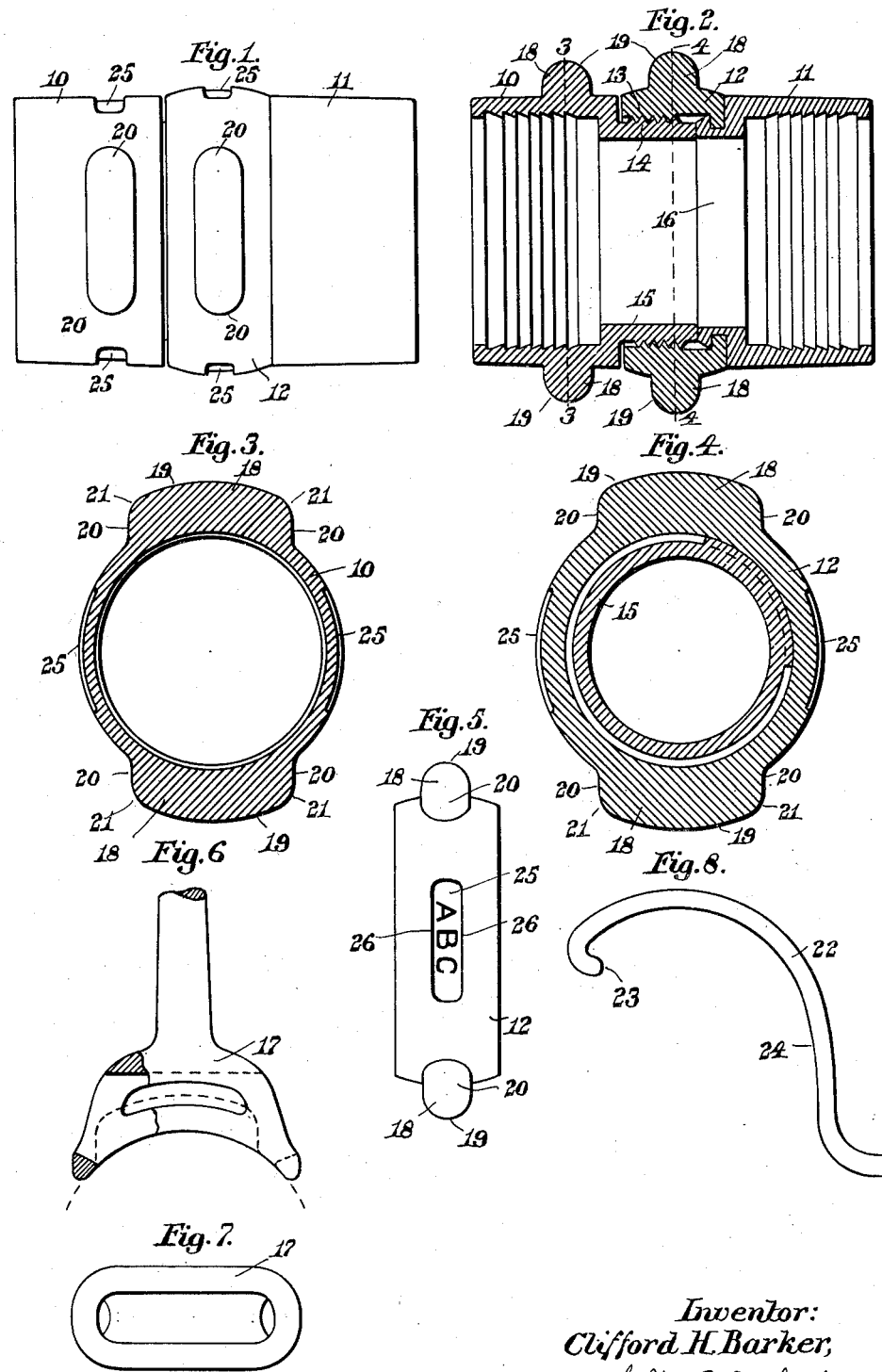
Inventor:
Clifford H. Barker,
by Walter E. Lombard,
Atty.

UNITED STATES PATENT OFFICE 1,978,245

HOSE COUPLING

Clifford H. Barker, Allston, Mass.

Application February 14, 1934, Serial No. 711,146

3 Claims. (Cl. 285—120)

This invention relates to hose couplings and particularly to couplings to be used on fire hose, and has for its object the production of a coupling which is so constructed that it may be drawn over a hose or the deck of a vessel without injuring the same.

This object is attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing

Figure 1 represents an elevation of a hose coupling embodying the principles of the present invention.

Figure 2 represents a horizontal section of same on line 2, 2 on Fig. 1.

Figure 3 represents a transverse section of same on line 3, 3 on Fig. 2.

Figure 4 represents a transverse section of same on line 4, 4 on Fig. 2.

Figure 5 represents an elevation of the movable end member of said coupling.

Figure 6 represents an elevation of a portion of a spanner wrench adapted for use on said coupling, the handle thereof being broken off.

Figure 7 represents an end elevation of said spanner wrench, and

Figure 8 represents an elevation of a portion of another spanner wrench which may be used on said coupling.

Similar characters indicate like parts throughout the several figures of the drawing.

In the drawing, 10 and 11 are two annular members adapted to be secured to sections of fire-hose in any well known manner.

The member 11 has a collar 12 swiveled thereto in the usual manner.

This collar 12 is provided at its outer end with a female thread 13 adapted to receive a male thread 14 on the reduced cylindrical portion 15 of the member 10.

By rotating the collar 12 the inner end of the member 15 may be drawn into contact with the inner end of the reduced portion 16 of the member 11.

This construction as thus described is the usual construction in fire hose couplings.

The collar 12 and the threaded member 10, 15 are usually provided with oppositely disposed cylindrical pins extending outwardly from the outer surfaces of these elements.

Where such pins are used they are liable to be damaged by dropping the coupling on hard surfaces causing sharp edged burrs to be formed on the outer ends thereof.

When these burrs are thus formed on the outer ends of the pins they cause considerable damage to the hose sections in case the coupling is drawn over the same, the burrs cutting into the surface of the hose and causing considerable injury thereto, weakening the same and ultimately forming leaks in the hose.

Moreover, fire-hose when used on a vessel must be frequently used on the deck thereof and when the burred ends of the coupling pins are drawn over the deck, the surface of the deck is greatly marred by scratches formed by these sharp edged burrs.

Another difficulty found with these radial cylindrical pins is that a spanner wrench such as the wrench 17, shown in Figs. 6 and 7 of the drawing, cannot always be kept in position and is liable to move laterally at an angle which is very objectionable.

To obviate these objections is the principal object of the present invention.

To this end cylindrical projecting pins are omitted and in lieu thereof the elongated lugs 18 are used.

These lugs 18 project outwardly from the surface of the collar 12 and the member 10 the same distance that the cylindrical pins extend when used.

Instead of having a flat surface on the outer end of the lugs 18 such as is common where the cylindrical pins are used, the whole length of the lugs 18 are made semi-cylindrical, as shown clearly at 19 in Fig. 2 of the drawing.

The opposite ends of the lugs 18 are also semi-cylindrical as indicated at 20, in Fig. 1.

The semi-cylindrical surface 19 and the semi-cylindrical surfaces 20 at the ends of the lugs 18 are rounded over to meet each other, as indicated at 21 in Fig. 3 of the drawing.

By thus providing elongated lugs, the whole exterior surface of which is rounded over, there is no opportunity of forming burrs thereon when the couplings are dropped into contact with hard surfaces.

Owing to the rounded surfaces of the lugs 18 the coupling may be drawn over hose sections, deck surfaces and the like, without causing any injury thereto.

Owing to the fact that these lugs are formed with rounded surfaces, the form of wrench 17 as shown in Figs. 6 and 7 may be more readily placed upon the lugs 18, when it is desired to connect or disconnect the member 10 from the collar 12.

Owing to the fact that the side walls of the lugs 18 are parallel when the wrench 17 is placed on a lug 18, there is no chance for lateral movement thereon as is the case when such a wrench is applied to the cylindrical pin now in common use.

The opposite ends of the lugs 18 are parallel, thereby making it possible to use the form of wrench 22 as shown in Fig. 8 of the drawing.

When this wrench 22 is used the bearing end 23 is placed against one end 20 of a lug 18 and the part 24 thereof rests in a depression 25 in either the member 10 or the collar 12.

The parallel walls 26 of this depression will prevent any lateral movement of the wrench 22 when in use.

The two styles of wrenches 17 and 22 are the kind of spanner wrenches which are most used in connection with fire-hose couplings, and by dispensing with the cylindrical pins now in common use and substituting therefor the elongated lugs 18, it is obvious that either form of wrench now in use may be utilized.

It is believed that the operation and many advantages of the invention will be understood without further description.

Having thus described my invention, I claim:

1. In a hose coupling having a pair of hose connectors and a member swiveled to one of said connectors and threaded to the other, wrench engaging lugs of substantial length adapted for use with a conventional wrench and extending circumferentially of the outer surface of said swiveled member and the threaded hose connector, said lugs having rounded outer surfaces and straight sides parallel with the sides of said swivel member.

2. In a hose coupling having end members and a collar swiveled to one of said end members and threaded to the other, said collar having a lug forming a wrench engaging member of substantial length adapted for use with a conventional wrench and having straight parallel sides extending circumferentially of the exposed surface thereof, said lug having a surface continuously rounded both longitudinally, transversely and at the extremities thereof.

3. In a hose coupling having end members and a collar swiveled to one of said end members and threaded to the other, and said other member and said collar each having oppositely disposed lugs, each forming a wrench engaging member of substantial length adapted for use with a conventional wrench and provided with parallel sides extending circumferentially of the exposed surfaces thereof, said lugs each having a surface rounded continuously both longitudinally and transversely, the longitudinal surfaces being concentric to the axis of said collar and end members.

CLIFFORD H. BARKER.